(12) United States Patent  (10) Patent No.: US 8,788,454 B2
Žižka et al.  (45) Date of Patent: Jul. 22, 2014

(54) WORK OPTIMIZATION

(75) Inventors: Ondřej Žižka, Raleigh, NC (US); Peter Skopek, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/220,180

(22) Filed: Aug. 29, 2011

(65) Prior Publication Data

US 2013/0054646 A1   Feb. 28, 2013

(51) Int. Cl.
*G06F 17/30* (2006.01)
(52) U.S. Cl.
USPC .......................................... 707/609; 707/664
(58) Field of Classification Search
USPC .................................................. 707/609, 664
See application file for complete search history.

(56) References Cited

U.S. PATENT DOCUMENTS

| 6,240,412 | B1* | 5/2001 | Dyko et al. ............................ 1/1 |
| 7,113,933 | B1* | 9/2006 | Imholte ........................ 705/7.15 |
| 7,349,978 | B2* | 3/2008 | Tan et al. ...................... 709/237 |
| 8,488,557 | B2* | 7/2013 | Liu et al. ....................... 370/331 |
| 2007/0038959 | A1* | 2/2007 | Bertram et al. ............... 715/846 |
| 2010/0057405 | A1* | 3/2010 | Wu ................................ 702/187 |
| 2010/0281487 | A1 | 11/2010 | Schneider et al. |
| 2012/0076423 | A1* | 3/2012 | Tang et al. .................... 382/203 |
| 2013/0226886 | A1* | 8/2013 | Kamimura .................... 707/695 |

* cited by examiner

*Primary Examiner* — Kim Nguyen

(74) *Attorney, Agent, or Firm* — Lowenstein Sandler LLP

(57) ABSTRACT

A work optimization module identifies a tag associated with a first task, where the first task is associated with a first user. The work optimization module compares the tag to a plurality of tags associated with a plurality of entries in a database, where each entry in the database corresponds to a task and comprises one or more tags describing the task. If the tag matches one of the plurality of tags, the work optimization module detects a duplication of the first task and a second task corresponding to one of the plurality of entries in the database, wherein the second task is associated with a second user.

21 Claims, 6 Drawing Sheets

| Database 322 | | | |
|---|---|---|---|
| Date /323 | User ID /324 | Task Description /325 | Tags /326 |
| 12JUN2011 | JD126 | Plot performance on line graph | performance, plotting, graph |
| 13JUN2011 | LR742 | Create line graph of product performance | line graph, performance |

330 → row 1
340 → row 2

Fig. 3

WORK OPTIMIZATION

TECHNICAL FIELD

This disclosure relates to the field of task management and, in particular, to work optimization for reduction of duplicated work.

BACKGROUND

Large organizations, such as corporations, universities, etc., may typically be hierarchically divided into many organizational units. For example, there may be one top-level executive, or a top-level management group, any number of intermediate managers or sub-managers, likely constituting a number of different management tiers within the hierarchy, and then individual workers, students, etc. The organization as a whole, or a subset of the organization, may have a particular goal, towards which it is working. To reach the goal, there may be any number of projects and/or tasks which may need to be completed. It is highly likely that these tasks may be divided up among different units of the organization.

For example, the top-level executive of an organization may stipulate a general goal of providing graphical reporting on the performance of the organization's products. Various intermediate managers may be assigned different projects, all directed towards reaching the general goal. The intermediate managers may assign individual workers specific tasks related to one aspect of the general goal, such as plotting of performance results. It may be the case that the individual workers are not aware of the context of their assigned task.

Due do the multiple layers of the organizational hierarchy, it is possible that in developing specific tasks from the general goal, multiple different individuals will perform duplicate work. As the individuals may be part of different organizational units, have different direct and/or intermediate managers, work in different locations, etc., they may not be aware of the redundancy of their work. As the size of the organization and/or the complexity of the general goals and specific tasks increases, detection of the duplication becomes more difficult. Failure to detect and remedy the duplication of work may result in increased costs as well as the waste of other organizational resources.

BRIEF DESCRIPTION OF THE DRAWINGS

The present disclosure is illustrated by way of example, and not by way of limitation, in the figures of the accompanying drawings.

FIG. 3 is block diagram illustrating a work optimization database, according to an embodiment.

DETAILED DESCRIPTION

Figure 1:
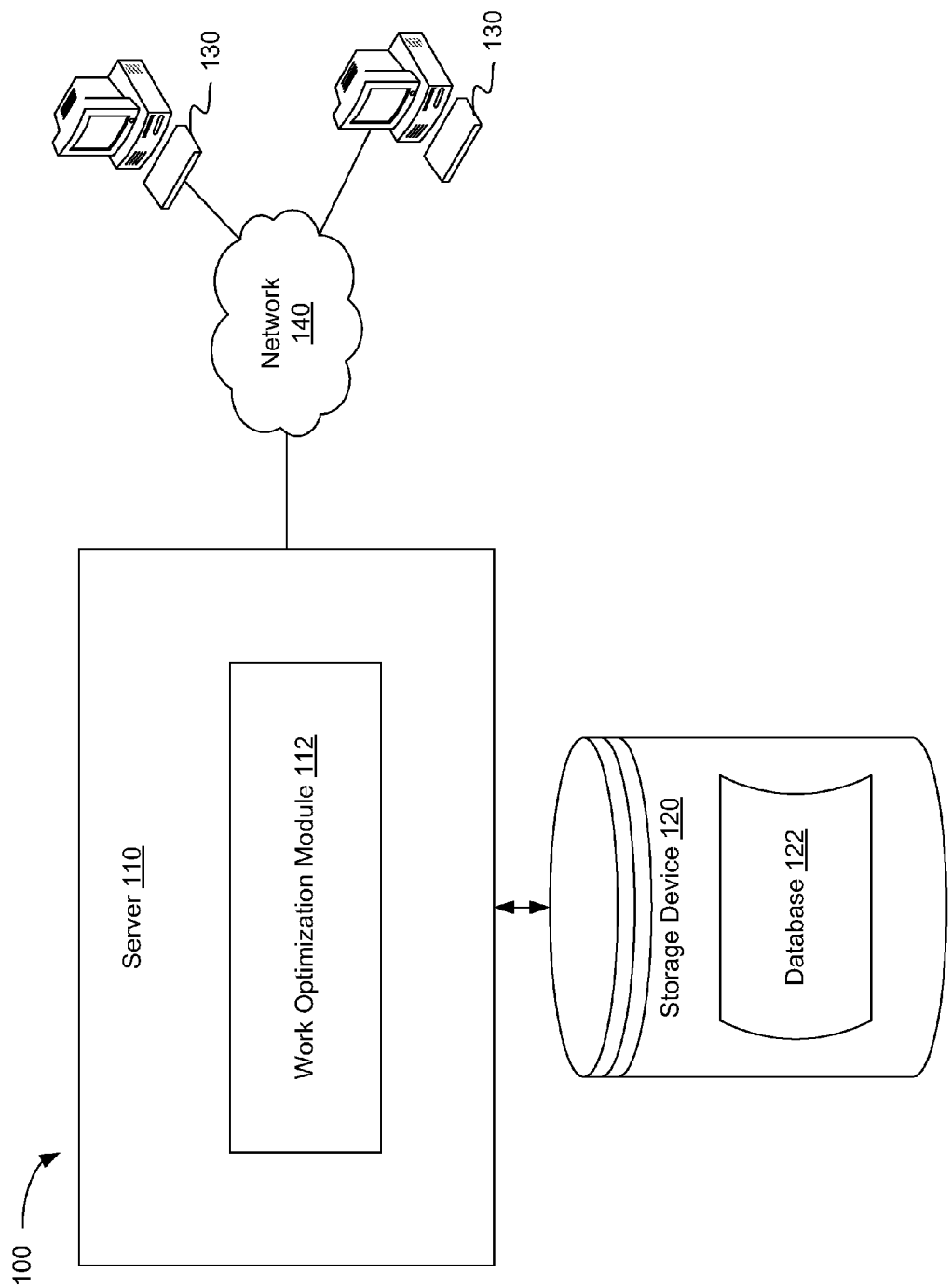
FIG. 1 is a block diagram illustrating a computing environment for work optimization, according to an embodiment.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments are described for work optimization. In one embodiment, a work optimization module identifies a tag associated with a first task, where the first task is associated with a first user. The work optimization module compares the tag to a plurality of tags associated with a plurality of entries in a database, where each entry in the database corresponds to a task and comprises one or more tags describing the task. If the tag matches one of the plurality of tags, the work optimization module detects a duplication of the first task and a second task corresponding to one of the plurality of entries in the database, wherein the second task is associated with a second user.

In one embodiment, the work optimization module detects an occurrence of a comparison event. The comparison event may include, for example, the creation of a new entry in a work database, the expiration of a periodic interval, a specific request that a comparison be performed, or some other event. In response to detecting the event, the work optimization module compares a tag or tags associated with one entry in the database to the tags associated with all of the other entries in the database. In one embodiment, the database may be a work database where each entry corresponds to a particular task. The entry identifies an individual who performed, is performing, or will perform the task and contains one or more tags describing the task and/or the work being performed in association with the task. The tags may be, for example, individual words, or a series of words, that describe or otherwise relate to the task. Comparing the tags from different entries in the database, allows the work optimization module to determine if there is any work duplication in the organization (i.e., whether multiple individuals are performing the same task unnecessarily).

In one embodiment, the work optimization module employs a threshold to determine whether there is a redundancy. If the threshold is met, the work optimization module generates a notification which is sent to the individuals associated with the entries in the database having matching tags. The notification may notify the individuals that there is a possible redundancy in the work being performed, so that they may contact one another and take appropriate action.

Identifying redundancy of work being performed within an organization has numerous benefits. The work optimization methods described herein can save significant time, money, and other resources. Eliminating redundancy may also allow an organization to meet its general goals in a more timely and efficient fashion.

FIG. 1 is a block diagram illustrating a computing environment for work optimization, according to an embodiment of the present invention. In one embodiment, network environment 100 includes server 110, storage device 120, and one or more client devices 130. Server 110 may be a computing device, such as computing device 600, described below with respect to FIG. 6. Client devices 130 may be used by a user or users to access server 110 and any applications or services running thereon. Client devices 130 may be connected to server 110 through a network 140, which may be, for example, a local area network (LAN), a wide area network (WAN), a global area network (GAN) such as the Internet, or a combination of such networks. In another embodiment, each client device 130 may have a direct connection to each of the other devices in the network. The illustrated embodiment shows one server 110 and two client devices 130, however, in other embodiments, there may be any number of servers 110 or client devices 130, and environment 100 may include additional and/or different devices.

In one embodiment, server 110 may include work optimization module 112. Work optimization module 112 may detect redundancy in the performance of work, tasks, projects, etc and notify the affected individuals so that the redundancy may be eliminated. Work optimization module 112 may detect redundancy by maintaining a work database 122. Work database 122 may include a number of entries corresponding to the current tasks being performed by different individuals. Each entry may include a number of tags that describe the task with which the database entry is associated. Work optimization module 112 may create entries in the database 122 and compare the tags of different entries to detect redundancy.

In one embodiment, work database 122 may be stored in storage device 120 connected to server 110. Storage device 120 may include mass storage devices which can include, for example, flash memory, magnetic or optical disks, or tape drives, read-only memory (ROM); random-access memory (RAM); erasable programmable memory (e.g., EPROM and EEPROM); flash memory; or any other type of storage medium.

Figure 2:
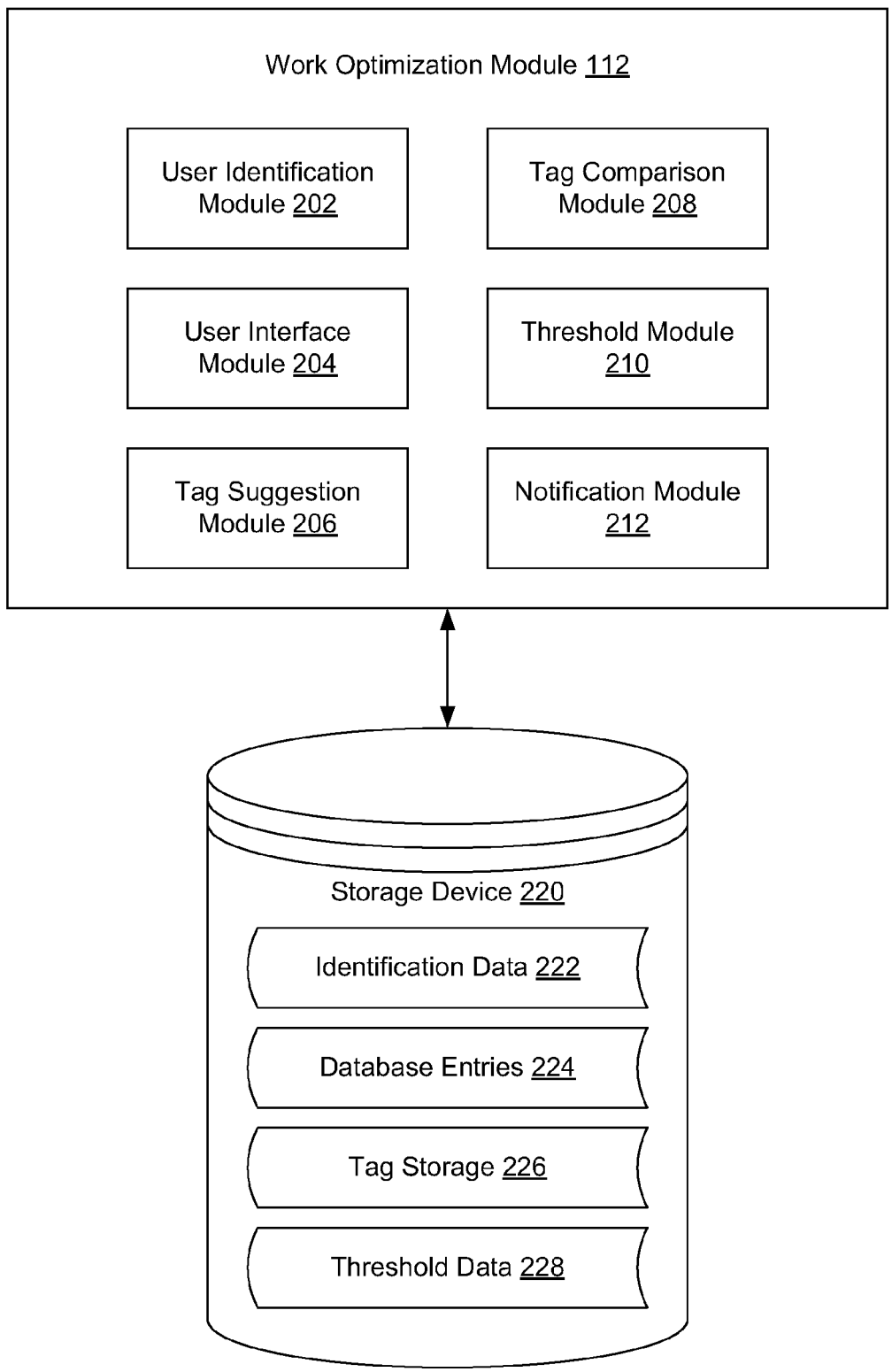
FIG. 2 is a block diagram illustrating a work optimization module, according to an embodiment.

FIG. 2 is block diagram illustrating a work optimization module, according to an embodiment of the present invention. In one embodiment work optimization module 112 runs on server 110, as shown in FIG. 1. In one embodiment, work optimization module 112 includes user identification module 202, user interface module 204, tag suggestion module 206, tag comparison module 208, threshold determination module 210, and notification module 212. Work optimization module 112 may be coupled to a storage device 220 which includes identification data 222, database entries 224, tag storage 226 and threshold data 228. In one embodiment, storage device 220 may be representative of storage device 120, as discussed above.

Work optimization module 112 may manage a database which can be used to detect redundancies in the work being performed by different individuals in an organization. Work optimization module 112 may receive information from individuals regarding the work they are performing and store that information in the database. In one embodiment, user identification module 202 determines and/or verifies the identity of an individual user. For example, the user may log in to the work optimization system by providing log in information which user identification module 202 compares to identification data 222 stored in storage device 220. In the event that identification data 222 is not stored in storage device 220 for a particular user, user identification module 202 may receive log in or identification information from the user, verify that it is associated with a valid user, and store it in storage device 220. The identification data 222 may be used to associate a particular entry in the work database with the individual user, as will be described further below.

Work optimization module 112 may also include user interface module 204. User interface module 204 may provide a user interface to a user (e.g., on client device 130) so that the user may interact with the work optimization system provided by work optimization module 112. In one embodiment, the user interface module 204 may provide a series of fields, into which the user may input information, in order to create a database entry. The fields may include an identifier field for the user, a description field of the task or work being performed, and a tag field for one or more tags which further describe the task. The user may enter values into these fields using, for example, a keyboard, mouse, touchscreen, voice commands, or other data input mechanism. The data received by user interface module 204 may be used to create database entries 224 stored in storage device 220. The fields provided by user interface module 204 may correspond to the fields that make up each database entry 224, as will be described further below. The user interface provided by user interface module 204 may also enable a user to perform a search of existing database entries 224 without creating a new entry. For example, the user may enter search criteria (e.g., tags or keywords) into a designated field of the user interface, which work optimization module 112 can use to identify corresponding database entries.

The tags used in database entries 224 may be non-hierarchical keywords or terms assigned to each entry. The tags may describe the task for which the database entry 224 was created and allow the similar entries to be easily found for comparison. The tags may be individual words or phrases selected informally by the user. In one embodiment, as part of the tag field presented in the user interface by user interface module 204, tag suggestion module 206 may suggest certain tags. Tag suggestion module 206 may refer to tag storage 226 in storage device 220, where previous tags used in the system are stored. In one embodiment, based on the first one or two characters entered into the tag field, tag suggestion module 206 may display a number of previously used tags that begin with the entered characters. In another embodiment, rather than just previously used tags, tag storage 226 may include additional possible tags, such as all of the words in a dictionary. In yet another embodiment, tag suggestion module 206 may suggest tags based on the information entered in the task description field by the user. For example, if a sentence is entered as the task description, tag suggestion module 206 may take each word of the sentence, or a selection of the words, and suggest that they be used as tags. In any case, the user may make a selection from the suggested tags to be used as the actual tags associated with the database entry 224. The tags may be later compared to tags of other entries 224 to determine if there is any redundancy with tasks being performed in the organization. In one embodiment, the same set of available tags is used for all tasks to allow easy comparison of database entries.

Tag comparison module 208 may perform two functions. The first is to detect the occurrence of a comparison event and the second is to perform an actual tag comparison. The comparison event may include, for example, the creation of a new database entry 224, an expiration of a periodic interval (e.g., daily, hourly), a specific request that a comparison be performed, or some other event. When a user, through user interface module 204, creates a new entry in the database, tag comparison module may recognize the creation of the database entry 224 and trigger a comparison. In another embodiment, a timer (not shown) may be set to a certain value, such that when the timer expires, tag comparison module 208 will trigger a comparison between the tags of all or a subset of the database entries. In yet another embodiment, a user, system administrator, manager, or some other individual make make a specific request (e.g., using client device 130) which may cause tag comparison module 208 to trigger a comparison. In this case, tag comparison module 208 may compare the tags of one database entry to another or set of entries, or may compare received search criteria to the tags of one or more other database entries.

Upon detecting a comparison event, tag comparison module 208 may perform a tag comparison. Tag comparison module 208 may use any number of different algorithms, formulas, calculations, etc., to determine whether the tags of two database entries match. One consideration that tag comparison module 208 may take into account is whether a match has already been detected with another entry or if a user has indicated that a particular entry should be ignored. If either of these conditions are met, tag comparison module 208 may not perform a tag comparison. Another consideration is the number of tags that are exact matches between two database entries. Tag comparison module 208 may start with a first tag of a first database entry and compare it to each tag in a second database entry. This process may continue comparing all of the tags in the first entry to all of the tags in the second entry. The number of matches may be counted and stored as a ratio of all possible matches. The resulting value can be used to express the closeness of the matching between entries. In different embodiments, these considerations may be correspondingly weighted, such that each is worth the same or different amounts in determining whether there is a match between the database entries. Tag comparison module 208 may then repeat the comparison for each of the other database entries 224.

In response to detecting a match between the tags of two or more database entries 224, threshold module 210 may determine if a threshold is met. The threshold may represent some minimum number of tag matches that must be present for the tasks to be considered duplicate. For example, if the threshold is two, threshold module 210 may determine if at least two tags are shared by the different database entries 224. The threshold may be configurable by a user and may be stored as threshold data 228 in storage device 220. In one embodiment, there may be different thresholds for different users identified by user identification module 202. In another embodiment, the threshold may have a date component factored in. For example, the dates that the tasks having matching tags were created might have to be within one month of each other. Threshold module 210 may compare the date stored with each database entry 224 to determine if they are within the threshold. In other embodiments, additional factors may be considered in determining if the threshold is met. In different embodiments, these considerations or factors may be correspondingly weighted, such that each is worth the same or different amounts in determining whether there is a match between the database entries.

The algorithm used to identify a duplication of tasks may vary by implementation. Nevertheless, one example of a algorithm may be referred to as "Naive Bayesian Classifier." The algorithm may be defined as:

$$A*(B*7+C*3+(\cos(-E*pi)+1)/2*3)/13 - D$$

In one embodiment, the constants 7, 3, 3 represent a distribution of importance between variables contributing to the result (i.e., a weighting of the different factors. The constant 13 puts the result of the algorithm back in the range <0, 1>. The variable A may represent whether the current user (e.g., author of the entry being added) has the compared an entry marked as ignored (which should be excluded from possible matches). If the entry was marked Ignore: A=0, otherwise A=1. The variable B may represent a ratio of the count of exact matches of a individual tags to total count of all tags. The value of B may be a value between 0 and 1. The variable C may represent when the compared entry was created (i.e., it's age or obsoleteness). With increasing age, the chance of the corresponding tasks being duplicates decreases. The value of C may be counted as 1/sqrt(1+n), where "n" is the age of the entry in days. The variable D may represent the current user's threshold setting and include a value between 0 and 1. A higher value decreases chance of detecting a duplicate task (and generally limits the number of detections for that user). The variable E may represent the relative score of the author of the compared entry and have a value from 0 to 1. A higher value increases the chance of detecting a duplicate task. A value 0.5 eliminates the influence of this variable. The part of the algorithm including (cos(−E*pi)+1)/2 puts the result in the range <0, 1> with "smooth ends" (i.e., a higher impact in the middle and lower impact at extreme values). In other embodiments, some other algorithm may be used.

Upon detecting matching tags and determining that the match threshold is met, notification module 212 may provide a notification to the individuals affected by the duplication. Each database entry 224 may include an identifier of the user associated with the task. In one embodiment, the database entry 224 may also include contact information for the user, however, in other embodiments, the contact information may be stored in a separate database (not shown). Notification module 212 may determine the contact information, either from the database entry 224 or from the separate database, of the individuals associated with each of the database entries 224 having matching tags. Notification module 212 may sent them a message indicating that there is a conflict between the task they are performing and another task performed by another individual. The notification message may include the name and contact information of the other individual so that the two can get in contact to resolve the duplication. The notification may be provided, for example, by a pop-up window in a web interface, an email message, a text message, a voice message, or by some other means.

In one embodiment, notification module 212 may keep track of which users have been notified about the conflicts between their associated tasks. For example, upon sending a notification to a user, notification module 212 may add a notation to the corresponding database entry 224, may add an entry in a separate notification database (not shown), or may otherwise indicate that this particular user has been notified about this particular conflict. In one embodiment, prior to providing a conflict message to a user, notification module 212 may verify that the user has not already been notified regarding this particular conflict.

FIG. 3 is block diagram illustrating a work optimization database, according to an embodiment of the present invention. Database 322 may be representative of database 122, described above with respect to FIG. 1. Database 322 includes a number of database entries 330, 340, which may be representative of database entries 224, described above with respect to FIG. 2. In one embodiment, each database entry 330, 340 may contain a number of fields, including Date 323, User ID 324, Task Description 325, and Tags 326.

Date field 323 may store a value representing the date on which the database entry 330 was created. The date may be determined from a calendar or timer maintained by work optimization module 112, or may be determined from some external source. User ID field 324 may store a value representing the user associated with the database entry 330. The user may be the individual who created the database entry 330, the user who performed the task associated with the database entry 330, or both. The value of User ID field 324 may be determined by user identification module 202, as discussed above. The value may include for example, the user's name, initials, ID number, employee number, some other value, or some combination of these values.

Task Description field 325 may store a value representing a description of the task with which the database entry 330 is associated. The description may be one or more sentences, describing, in plain English (or the appropriate language), the goal or main idea of the task. The task description may be received by work optimization module 112, from a user, through the user interface provided by user interface module 204. Tags field 326 may store one or more tags describing the task, as discussed above. In one embodiment, there may be some restriction on the format of the tags. For example, tags may be limited to lowercase alphabet letters and numbers with a length of three to ten characters. There may also be limits on the number of tags used in an entry, such as for example, a minimum of two tags and a maximum of six. In other embodiments, some other restrictions may be used, or there may be no restrictions. The tags may be individual words or phrases related to the task that can be used to determine whether one task duplicates another. Tag comparison module 208 may compare the tags of different database entries 330, 340 to make this determination. In one embodiment the tags may be entered by the user through the user interface, as discussed above.

In one embodiment, rather than being formed through user input through the user interface presented by user interface module 204, the entries 330, 340 of database 322 may be formed through the usage of a secondary computer application program. Work optimization module 112 may integrate with this other computer application program, for example, by publishing an application programming interface (API) that the other computer application program may use. The integration may function such that the database entries 330, 340 are created automatically as a by-product of usage of the secondary computer application program.

For one example, the secondary computer application program may be a source code management system. In the source code management system, users may commit their code, or send a copy of their current code state to global storage, at periodic intervals (e.g., daily). In some cases, the users may attach a short (e.g., 1-2 lines) description of the changes they have made to the code. These descriptions may be modified to include tags, as used by work optimization module 112. In one embodiment, upon committing a piece of code, the API may provide the description and tags to work optimization module which may generate a corresponding database entry, as discussed above. The description 325 and tags 326 may be pulled from the attachment sent with the code commit, and the user ID 324 may be pulled from the log in credentials provided by the user to the source code management system. This prevents the user from having to separately create a database entry in addition to his normal work procedures. Similarly, if a conflict is detected, a notification message may be provided to the user through the source code management system.

Figure 4:
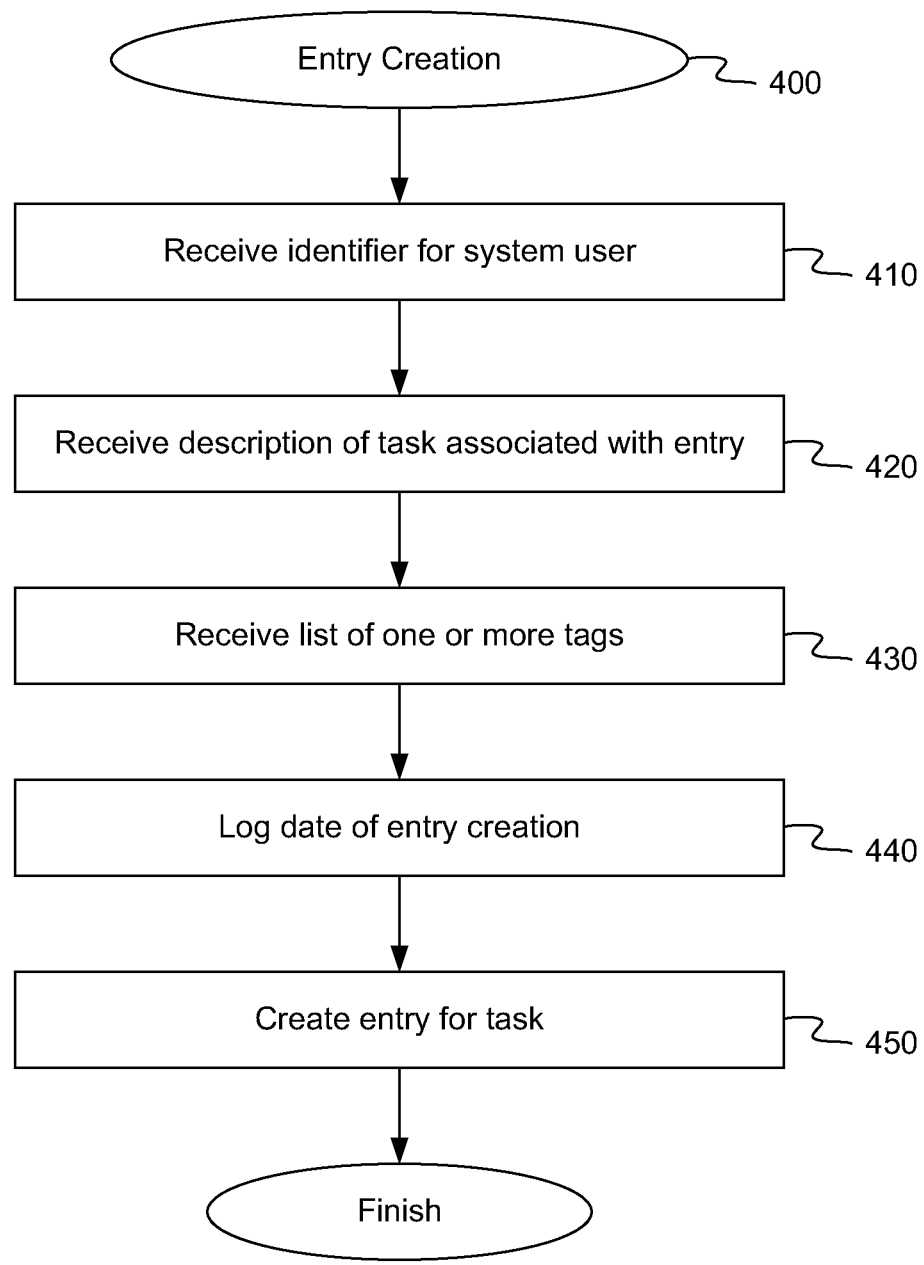
FIG. 4 is a flow diagram illustrating an entry creation method for a work optimization database, according to an embodiment.

FIG. 4 is a flow diagram illustrating an entry creation method for a work optimization database, according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to create an entry in a work optimization database, where the entry corresponds to a task being performed by an individual. In one embodiment, method 400 may be performed by work optimization module 112, as shown in FIGS. 1 and 2.

Referring to FIG. 4, at block 410, method 400 receives an identifier for a system user. In one embodiment, the identifier is received by user identification module 202 of work optimization module 112 and stored in a database entry 330 in the User ID field 324. The identifier may be received as part of log in information, input by the user when logging into the system or may be a separate identifier input specifically for the database entry. The identifier may consist of the user's name, initials, employee ID number, social security number, some combination of these identifiers, or some other identifier. The identifier uniquely identifies the individual associated with the database entry 330 so that it is known who to notify in the event that the system determines that there has been a duplication of a particular task within the organization.

At block 420, method 400 receives a description of a task associated with the database entry 330. In one embodiment, the description is received through a user interface provided by user interface module 204 or work optimization module 112 and stored in a database entry 330 in the Task Description field 325. The description may be one or more sentences or phrases, describing, in plain English (or the appropriate language), the goal or main idea of the task. The description may be useful to any person who is reviewing the database entry 330 or who receives a notification indicating a possible duplication, to allow them to easily ascertain what the task is seeking to accomplish.

At block 430, method 400 receives a list of one or more tags. In one embodiment, the tags are received through a user interface provided by user interface module 204 of work optimization module 112 and stored in a database entry 330 in the Tags field 326. The tags may be individual words or phrases related to the task that can be used to determine whether one task duplicates another. The tags may describe the task for which the database entry 330 was created and allow similar entries to be easily found for comparison. The user may simply enter a list of tags through the user interface, however, in other embodiments, tag suggestion module 206 may suggest certain tags, as described above. The tags may be later compared to determine if there is any redundancy with tasks being performed in the organization.

At block 440, method 400 logs the date that the database entry 330 was created. In one embodiment, the date is determined from a calendar maintained by work optimization module 112 or is received from some external source (e.g., from server 110 or over the Internet). The date may be stored in a database entry 330 in the Date field 323. The date that the entry was created may be used to determine whether there is a duplication of tasks. For example, there may be a threshold requiring that two database entries be created within a certain amount of time in relation to each other in order for the associated tasks to be considered duplicates. The threshold may be a default value or may be defined by the user and stored as threshold data 228 in storage device 220.

At block 450, method 400 creates the database entry 330 for the associated task. The database entry 330 may include the information received above and may be part of a database 322 containing a plurality of entries, where each entry corresponds to a different task. The database entries may be stored in a storage device 220 connected to work optimization module 112.

Figure 5:
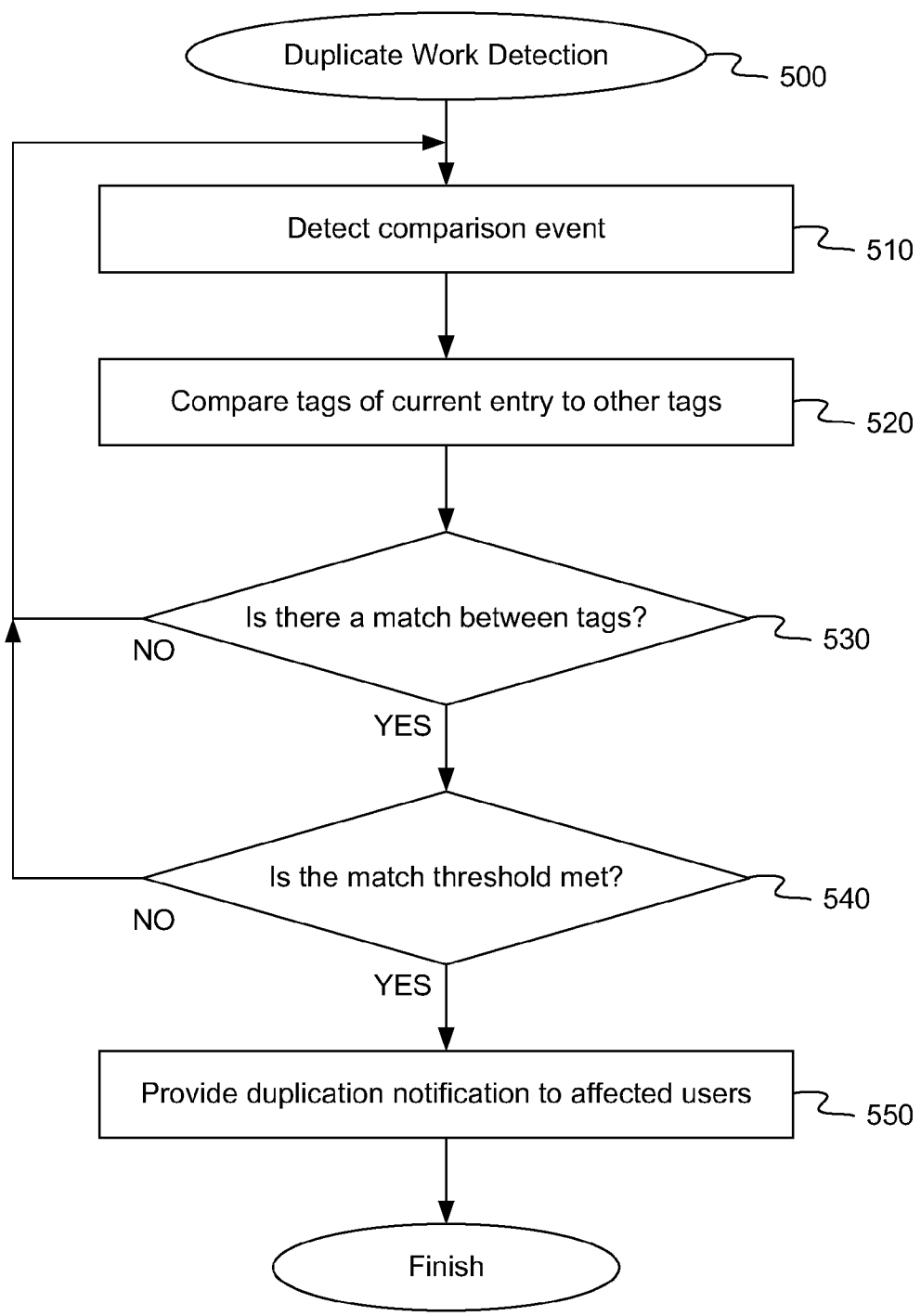
FIG. 5 is a flow diagram illustrating a duplication work detection method for work optimization, according to an embodiment.

FIG. 5 is a flow diagram illustrating a duplication work detection method for work optimization, according to an embodiment of the present invention. The method 500 may be performed by processing logic that is configured to detect duplicate tasks performed within an organization based on a series of entries in a work optimization database. In one embodiment, method 500 may be performed by work optimization module 112, as shown in FIGS. 1 and 2.

Referring to FIG. 5, at block 510, method 500 detects an occurrence of a comparison event. The comparison event may be any event that triggers a comparison of the tags of various database entries in the work database 322. The comparison event may include, for example, the creation of a new database entry 224, an expiration of a periodic interval, a specific request that a comparison be performed, or some other event. In one embodiment, tag comparison module 208 may monitor for and detect the occurrence of the comparison event.

At block 520, method 500 compares one or more tags of a current database entry 330 to the tags associated with other entries in the database 322. Tag comparison module may compare each tag of a selected entry to each tag of each other entry in the database 322. Tag comparison module 208 may flag or otherwise indicate entries where at least one tag matches at least one tag of the selected entry.

At block 530, method 500 determines whether there is a match between at least one tag of the current database entry 330 and at least one tag of at least one other entry in the database 322. If at block 530, method 500 determines that there is at match, at block 540, method 500 determines if a match threshold is met. Threshold module 210 may examine different factors of the match, such as a ratio of the total number of matches between two entries to the possible number matches. A user may have a threshold set, requiring for example, that the ratio be at least one half in order for the threshold to be met. Another threshold example may be related to time, requiring for example, that the two entries with at least one match have been created within three months of each other.

If at block 540, method 500 determines that the match threshold is met, at block 550, method 500 creates and provides a duplication notification to the affected users. In one embodiment, the notification may be generated and provided by notification module 212 of work optimization module 112. In one embodiment, the notification may be sent to at least two users, including the individuals associated with each of the database entries that had matching tags. In another embodiment, the notification may be sent to only one of the users associated with one of the tasks or the notification may be sent to some other individual, such as a system administrator. In one embodiment, the notification may indicate that there is a conflict between the task the user is performing and another task performed by another individual. The notification may include the name and contact information of the other individual and a description of the related task. The notification may be provided in any number of ways, including by a pop-up window in a web interface, an email message, a text message, a voice message, or by some other means.

If at block 530, method 500 determines that there is not a match between tags, or at block 540, method 500 determines that the match threshold is not met, method 500 returns to block 510 to await the detection of another comparison event. This condition indicates that there are no entries in the database 322 for duplicate tasks that warrant further investigation.

Figure 6:
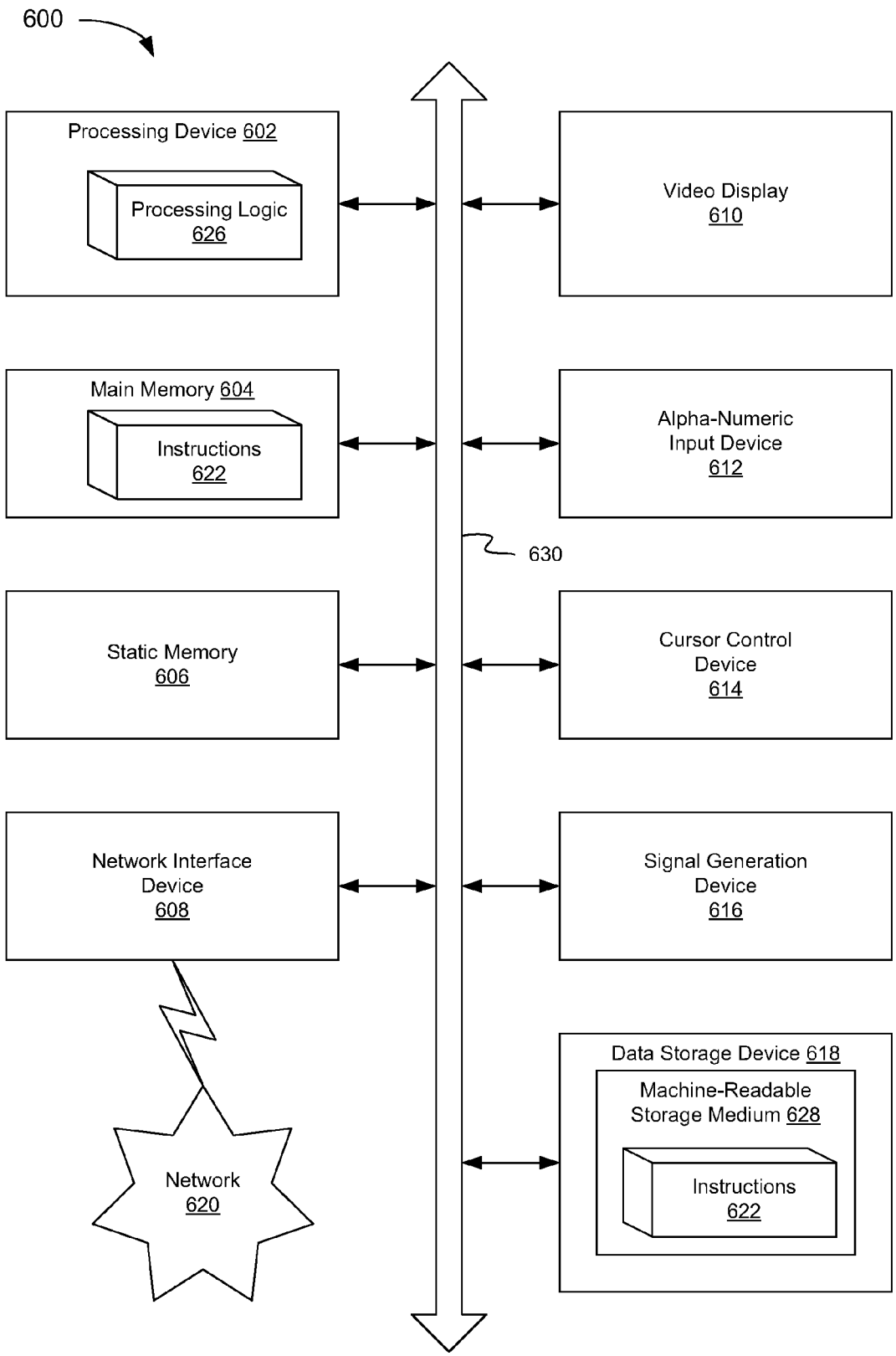
FIG. 6 is a block diagram illustrating one embodiment of a computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as server 110, running work optimization module 112.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608.

The machine-readable storage medium 628 may also be used to store instructions to perform a work optimization method to detect duplication of tasks, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
   receiving, from a plurality of users associated with an organization, descriptions of tasks performed by each of the plurality of users within the organization and a plurality of tags associated with the tasks;
   identifying a tag of the plurality of tags associated with a first task, wherein the first task is associated with a first user of the plurality of users who performs the first task;
   comparing, by a processing device, the tag to the plurality of tags, wherein the plurality of tags are associated with a plurality of entries in a database, and wherein each entry in the database corresponds to a task and comprises one or more tags describing the task;
   in response to the tag matching one of the plurality of tags, detecting a duplication of the first task and a second task corresponding to one of the plurality of entries in the database, wherein the second task is performed by a second user of the plurality of users; and
   providing a notification to the first user who performs the first task and to the second user who performs the second task, wherein the notification indicates that the first task is a duplicate of the second task, wherein the notification indicates that at least one tag associated with the first task matches at least one tag associated with the entry corresponding to the second task, the notification comprising at least one of a pop-up window in a web interface, an email message, a text message, or a voice message.

2. The method of claim 1, wherein the tag associated with the first task is associated with an entry in the database corresponding to the first task.

3. The method of claim 1, wherein the tag associated with the first task comprises a search criterion input by a user.

4. The method of claim 1, further comprising:
   detecting an occurrence of a comparison event, wherein the comparison event comprises at least one of a creation of a new entry in the database, an expiration of a periodic interval, or a request that a comparison be performed.

5. The method of claim 1, wherein the comparing comprises determining if the tag associated with the first task matches at least one tag of at least one of the plurality of entries in the database.

6. The method of claim 1, further comprising:
   in response to the tag matching one of the plurality of tags, determining whether a match threshold is met.

7. The method of claim 6, wherein the match threshold comprises at least one of a predetermined number of matches or a predetermined length of time.

8. A system comprising:
   a processing device; and
   a memory coupled to the processing device; and
   a work optimization module, executed by the processing device from the memory, to:
      receive, from a plurality of users associated with an organization, descriptions of tasks performed by each of the plurality of users within the organization and a plurality of tags associated with the tasks;
      identify a tag of the plurality of tags associated with a first task, wherein the first task is associated with a first user of the plurality of users who performs the first task;
      compare the tag to the plurality of tags, wherein the plurality of tags are associated with a plurality of entries in a database, and wherein each entry in the database corresponds to a task and comprises one or more tags describing the task;
      in response to the tag matching one of the plurality of tags, detect a duplication of the first task and a second task corresponding to one of the plurality of entries in the database, wherein the second task is performed by a second user of the plurality of users; and
      provide a notification to the first user who performs the first task and to the second user who performs the second task, wherein the notification indicates that the first task is a duplicate of the second task, wherein the notification indicates that at least one tag associated with the first task matches at least one tag associated with the entry corresponding to the second task, the notification comprising at least one of a pop-up window in a web interface, an email message, a text message, or a voice message.

9. The system of claim 8, wherein the tag associated with the first task is associated with an entry in the database corresponding to the first task.

10. The system of claim 8, wherein the tag associated with the first task comprises a search criterion input by a user.

11. The system of claim 8, the work optimization module further to:
   detect an occurrence of a comparison event, wherein the comparison event comprises at least one of a creation of a new entry in the database, an expiration of a periodic interval, or a request that a comparison be performed.

12. The system of claim 8, wherein the comparing comprises determining if the tag associated with the first task matches at least one tag of at least one of the plurality of entries in the database.

13. The system of claim 8, the work optimization module further to:
   in response to the tag matching one of the plurality of tags, determine whether a match threshold is met.

14. The system of claim 13, wherein the match threshold comprises at least one of a predetermined number of matches or a predetermined length of time.

15. A non-transitory machine-readable storage medium storing instructions which, when executed, cause a processing device to perform operations comprising:
   receiving, from a plurality of users associated with an organization, descriptions of tasks performed by each of the plurality of users within the organization and a plurality of tags associated with the tasks;

identifying a tag of the plurality of tags associated with a first task, wherein the first task is associated with a first user of the plurality of users who performs the first task;

comparing, by the processing device, the tag to the plurality of tags, wherein the plurality of tags are associated with a plurality of entries in a database, and wherein each entry in the database corresponds to a task and comprises one or more tags describing the task;

in response to the tag matching one of the plurality of tags, detecting a duplication of the first task and a second task corresponding to one of the plurality of entries in the database, wherein the second task is performed by a second user of the plurality of users; and providing a notification to the first user who performs the first task and to the second user who performs the second task, wherein the notification indicates that the first task is a duplicate of the second task, wherein the notification indicates that at least one tag associated with the first task matches at least one tag associated with the entry corresponding to the second task, the notification comprising at least one of a pop-up window in a web interface, an email message, a text message, or a voice message.

16. The non-transitory machine-readable storage medium of claim 15, wherein the tag associated with the first task is associated with an entry in the database corresponding to the first task.

17. The non-transitory machine-readable storage medium of claim 15, wherein the tag associated with the first task comprises a search criterion input by a user.

18. The non-transitory machine-readable storage medium of claim 15, the operations further comprising:
  detecting an occurrence of a comparison event, wherein the comparison event comprises at least one of a creation of a new entry in the database, an expiration of a periodic interval, or a request that a comparison be performed.

19. The non-transitory machine-readable storage medium of claim 15, wherein the comparing comprises determining if the tag associated with the first task matches at least one tag of at least one of the plurality of entries in the database.

20. The non-transitory machine-readable storage medium of claim 15, the operations further comprising:
  in response to the tag matching one of the plurality of tags, determining whether a match threshold is met.

21. The non-transitory machine-readable storage medium of claim 20, wherein the match threshold comprises at least one of a predetermined number of matches or a predetermined length of time.

* * * * *